May 9, 1950 L. I. SMITH ET AL 2,506,907
CUT FILM HOLDER
Filed Jan. 12, 1948 2 Sheets-Sheet 1
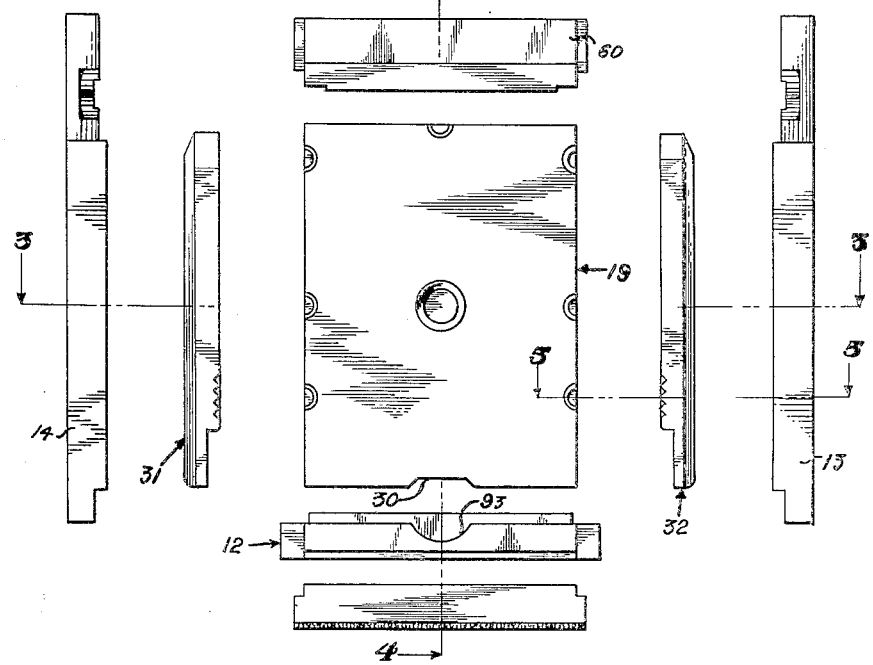
INVENTOR.
LELAND I. SMITH & RAYMOND ENGLE
BY
ATTORNEYS.

May 9, 1950 L. I. SMITH ET AL 2,506,907
CUT FILM HOLDER
Filed Jan. 12, 1948 2 Sheets-Sheet 2
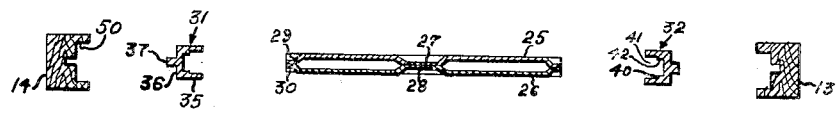
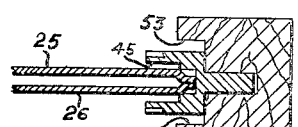
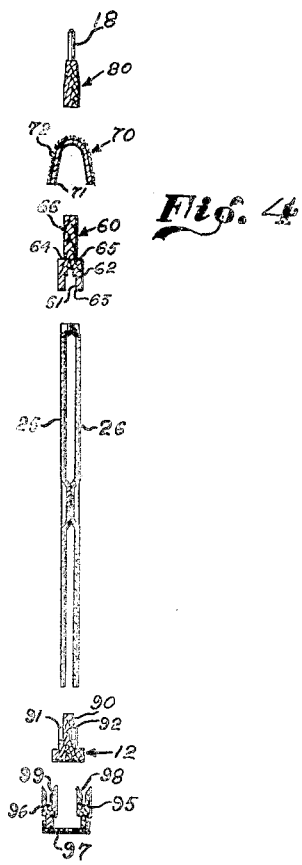
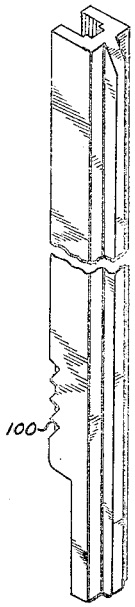
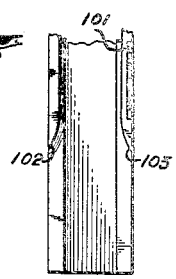
INVENTOR.
LELAND I. SMITH & RAYMOND ENGLE
BY
Huebner, Maltby & Buhler
ATTORNEYS.

Patented May 9, 1950

2,506,907

UNITED STATES PATENT OFFICE 2,506,907

CUT FILM HOLDER

Leland I. Smith and Raymond Engle, Glendale, Calif.

Application January 12, 1948, Serial No. 1,718

2 Claims. (Cl. 95—66)

Our invention relates to the art of photography and has special reference to a new and improved cut film holder which results in a more accurate location of the cut film and easier insertion into the film holder and more simplified and cheaper construction.

Cut film holders of this general nature have long been known in the art and they comprise essentially a frame for containing light-sensitive sheets of material for loading in the back of a camera and having a light shield or a dark plate removably disposed in front of the sensitive material so that after insertion into the camera, the dark plate may be removed and the film exposed to light by means of suitable shutters and lenses.

The cut film holders heretofore known to the industry have not proved entirely satisfactory in that the tolerances required to permit easy and accurate insertion of cut film into a plate holder while working in a dark room, have been difficult to obtain without expensive manufacturing processes.

It is also highly important that the film be maintained in an absolutely flat plane. This has presented an additional problem in the heretofore known cut film holders, particularly in the larger sizes, because a relatively thin sheet of material was used which is difficult to prevent from buckling or bending unless a suitable backing was provided. Provision of such suitable backing resulted in additional expense of manufacture.

It is among the objects of our invention to provide a new and improved type of construction in which a high degree of accuracy can be maintained at relatively low construction or manufacturing costs.

It is also among the objects of our invention to provide a cut film holder which remains in an absolutely flat plane at all times thereby assuring a flat backing for the cut film.

Other objects and advantages of our invention will become apparent from the drawings and the specifications relative thereto.

In the drawings:

Figure 1 is a plan view of a cut film holder showing the dark plate and light sensitive film partially broken away.

Figure 2 is an exploded view showing the relationship of the various parts making up the plate holder in Figure 1.

Figure 3 is a sectional view taken through line 3—3 of Figure 2.

Figure 4 is a sectional view taken on line 4—4 of Figure 2.

Figure 5 is a partial section taken on line 5—5 of Figure 2 showing the parts assembled.

Figure 6 is an isomeric view of our new and improved slide track.

Figure 7 is a partial front view of the track shown in Figure 6.

Our invention comprises essentially a cut film holder, designated generally 10, having a top bar 11, a bottom bar 12 joined together in spaced relation by side bars 13 and 14. The top bar 11, bottom bar 12, side bars 13 and 14 define an opening 15, which is the desired size of the picture to be taken. The opening is normally covered by a dark slide 16 which completely covers the opening 15 and projects above the top of the bar 11. A handle 17 is provided on the top of the dark slide 16 for ease of inserting or removing. A pair of locks 18 are rotatably positioned in the top of the holder 10 adapted upon rotation to secure the dark slide 16 in the holder.

The plate holder 10 is also provided with a film supporting plate 19, adapted to maintain the cut film in a flat plane.

In Figures 2, 3 and 4, an exploded view is used to more clearly illustrate the shape and design of the various parts and the manner of assembly.

The film supporting plate 19, as herein illustrated, is shown as a pair of complementary sheets of metal 25 and 26, having centrally disposed inwardly directed dimples 27 and 28, and a plurality of inwardly directed peripherally disposed dimples 29 and 30. The dimples 27 and 28, 29 and 30 are adapted to cooperate and space the plates 25 and 26 in a uniform position and also to add rigidity to the material.

It will be understood that in plates of larger sizes a plurality of dimples can be substituted for dimples 27 and 28 depending upon the size of the material used. The sheets 25 and 26 are also formed with a notched section 30, the purpose of which will be explained later.

Complementary slide rails 31 and 32 are adapted to fit over the sheets 25 and 26 and to hold them in proper position. As will be seen in Figure 3, the side rails 31 and 32 are formed generally U-shaped and have a pair of upwardly extending sides 35, a base member 36 and a guide 37. The side walls 35 are formed with a shoulder 40 thereby defining, in cooperation with the base 36, a channel 41 having a relatively narrower cross-section 42 adjacent the base thereof. The width of the channel 42 corresponds with the overall width of the two sheets 25 and 26 as they are spaced by the dimples 27 and 28, 29 and 30.

A channel 41 exceeds the width of the channel 42 by twice the thickness of the film to be inserted therein so that when the sheets 25 and 26 are inserted into the groove 42, a track or slide 45 is defined by the side wall 35 and the sheets 25 and 26, which corresponds to the thickness of the film to be inserted therein.

Further referring to Figure 3, it will be seen that the side rails 13 and 14 are formed with a longitudinal groove 50 having a relatively narrow section at the bottom thereof adapted to receive the tongue or guide 37 of the slide rails 31 or 32. As will be noted in Figure 5, the width of the longitudinal groove 50 is greater than the overall width of the slide rails 31 and 32, the difference in width defining channels 53 and 54 which correspond to the thickness of the dark plate 16 and which act as guides for said dark plate. The narrow section of the longitudinal groove 50 is of the same width as the depending guide 37 on the slide rails 31 and 32, which positions the said slide rails, thereby accurately positioning the sheets 25 and 26 in the cut film holder.

For the purposes of explaining the construction of the top and bottom sections of the film plate holder, reference is made to Figure 4. The film holder is first assembled by placing plates 25 and 26 together in spaced relation as was illustrated in Figure 3. The plates are then secured to them by means of a securing rail 60 having a transverse groove 61. The transverse groove 61 is formed in a cross-section similar to the groove 41 of the side rails 31 and 32; that is, it has a narrower bottom groove 62 and a wider upper groove 63. The narrower bottom groove 62 is adapted to receive the sheets 25 and 26 and to define a pair of guides corresponding in width with the guides 53 and 54 and adapted to receive the end of the dark slide and hold it in position.

The securing rail 60 is also formed with a pair of oppositely disposed shoulders 64 and 65, thereby defining a narrower section 66, the purpose of which will be apparent with a further description of the method of assembling.

A light trap 70, which comprises a generally U-shaped member 71, is formed of spring material and covered exteriorly with a suitable lightproof material, such as felt 72. The light trap 70 fits down over the narrow section 66 and is adapted to lie against the shoulders 64 and 65. A top rail 80 is disposed in abutting relation against the light trap member 70 to hold it in position.

The side members 13 and 14 are formed with centrally disposed grooves, both top and bottom, and the members 12, 60 and 80 are formed with complementary tongues adapted to be disposed in said grooves in a well-known standard method of construction and securely glued in place. The bottom member 12 is formed with a forwardly extending lip 90 adapted to fit between the sheets 25 and 26, and is provided with shoulders 91 and 92 adapted to position said sheets. An undercut section 93 is formed in the bottom member 12 and adapted to correspond with the notched section 30 in the plates 25 and 26. The purpose of this undercut section is to provide means for removing the film after insertion into the plate holder by providing a space under which a person's fingernail or thumbnail may be inserted.

The means for inserting the film comprises a pair of complementary gates 95 and 96 secured to the base member 12 by means of a flexible fabric 97. The gates 95 and 96 are formed with transverse grooves 98 and 99 adapted to receive the end of the dark plate slide 16. The method of inserting the film is by rotating the doors 95 or 96 downwardly away from the base member 12 which permits insertion of the film by sliding it into track 45, as shown in Figure 5. When the gates 95 or 96 have been closed and the dark slide inserted, the end thereof will fit into the grooves 98 or 99, thereby locking the gates in closed position.

Referring to Figure 6, we have illustrated a further improvement which may be incorporated, if desired, and which comprises a plurality of undercut sections 100. These undercut sections comprise a plurality of V-shaped notches extending partially through the thickness of the side wall 35 and define a relatively thin section 101. The purpose of this type of construction is so that the photographer can easily remove the thin sections 101 in any combination desired to permit ready identification of exposed and developed film.

It will also be noted on Figure 7 that the leading edges of the side members 35 are tapered as at 102 and 103, which permits a lead or positioning means for the film so that it readily slides into proper position.

While we have herein shown and described our invention in what we have conceived to be the most practical and preferred embodiment, it is recognized that departures may be made therefrom within the scope of our invention, which is not to be limited to the details disclosed herein, but is to be accorded the full scope of the claims so as to embrace any and all equivalent devices.

Having described our invention, what we claim as new and desire to secure by Letters Patent is:

1. In a cut film holder having side members in spaced relation, a top and a bottom joined to opposite ends of said side members and defining together with said side members an opening for the exposure of said cut film, a film supporting plate comprising a pair of substantially flat metallic sheets, each of said sheets being formed with a plurality of dimples, said sheets being disposed in spaced relation by the abutment of said dimples so that said sheets will be maintained in substantially parallel flat planes, and a pair of oppositely disposed slide rails disposed adjacent and parallel to each of said side members, each of said slide rails being formed with a longitudinal groove having a relatively narrow section at the inner end thereof and a relatively wide section at the outer end thereof, said inner narrow section being adapted to receive the film holding plate, said film holding plate when inserted in said narrow section defining a slide for the reception of the edges of said cut film, said slide being defined by said film supporting plate and the side walls of the larger section of said longitudinal groove, and being adapted to hold said cut film, including the edges thereof, in a substantially flat plane, and presenting a continuous smooth surface adapted to aid in the insertion of said cut film, at least one edge of said slide rail being formed with a plurality of frangible areas which upon removal form recesses in said side thereby permitting exposure of parts of said film to record identification markings.

2. In a cut film holder having side members in spaced relation, a top and a bottom joined to opposite ends of said side members and defining together with said side members an opening for the exposure of said cut film, a film supporting plate comprising a pair of substantially flat metallic sheets, each of said sheets being formed with a plurality of dimples, said sheets being disposed in spaced relation by the abutment of said dimples so that said sheets will be maintained in substantially parallel flat planes, and a pair of oppositely disposed slide rails disposed adjacent and parallel to each of said side members, each of said slide rails being formed of one integral piece and with a longitudinal groove having a relatively narrow section at the inner end thereof and a relatively wide section at the outer end thereof, said inner narrow section being adapted to receive the film holding plate, said film holding plate when inserted in said narrow section defining a slide for the reception of the edges of said cut film, said slide being defined by said film supporting plate and the side walls of the larger section of said longitudinal groove, and being adapted to hold said cut film, including the edges thereof, in a substantially flat plane, and presenting a continuous smooth surface adapted to aid in the insertion of said cut film, each of said slide rails being also formed with a beveled edge at the point of entry of said cut film to facilitate entry therein.

LELAND I. SMITH.
RAYMOND ENGLE.

REFERENCES CITED

The following references are of record in the file of this patent:

UNITED STATES PATENTS

| Number | Name | Date |
|---|---|---|
| 1,469,814 | Folmer | Oct. 9, 1923 |
| 1,616,906 | Kroedel | Feb. 18, 1927 |